(12) United States Patent
Mikami et al.

(10) Patent No.: US 8,565,835 B2
(45) Date of Patent: Oct. 22, 2013

(54) MOBILE TERMINAL DEVICE AND DISPLAY METHOD OF MOBILE TERMINAL DEVICE

(75) Inventors: Keiko Mikami, Daito (JP); Tomoyo Yoshida, Daito (JP); Hiroyuki Okuno, Daito (JP); Masayuki Ono, Daito (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/333,800

(22) Filed: Dec. 21, 2011

(65) Prior Publication Data

US 2012/0165078 A1 Jun. 28, 2012

(30) Foreign Application Priority Data

Dec. 24, 2010 (JP) .................................. 2010-287959

(51) Int. Cl.
*H04B 1/00* (2006.01)
*G09G 5/00* (2006.01)

(52) U.S. Cl.
USPC ............................ 455/566; 345/619; 345/647

(58) Field of Classification Search
USPC .............. 455/566, 550.1, 73, 158.4; 345/653, 345/659, 647, 654, 676, 619
See application file for complete search history.

(56) References Cited

U.S. PATENT DOCUMENTS

| 2007/0229556 | A1* | 10/2007 | Kim et al. | 345/698 |
| 2009/0237373 | A1* | 9/2009 | Hansson | 345/174 |
| 2011/0001709 | A1* | 1/2011 | Wang | 345/173 |
| 2012/0188243 | A1* | 7/2012 | Fujii et al. | 345/426 |

FOREIGN PATENT DOCUMENTS

JP 2007-264771 A 10/2001

* cited by examiner

*Primary Examiner* — Sonny Trinh
(74) *Attorney, Agent, or Firm* — Procopio, Cory, Hargreaves & Savitch LLP

(57) ABSTRACT

A mobile terminal device includes a display section having a display surface for displaying a screen including information, an accepting section which accepts a moving operation for moving the screen, and a display control section which controls the display section based on the moving operation. When the moving operation for moving an end of the screen inside the end of the display surface is performed, the display control section controls the display section so that the screen is deformed to a moving direction of the screen in a direction of movement of the screen by the moving operation.

12 Claims, 13 Drawing Sheets

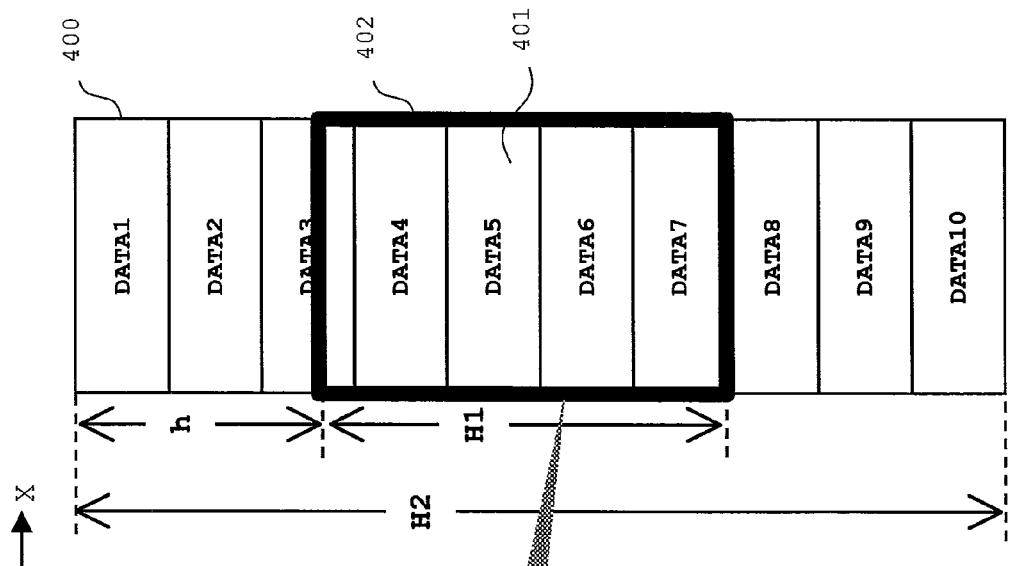
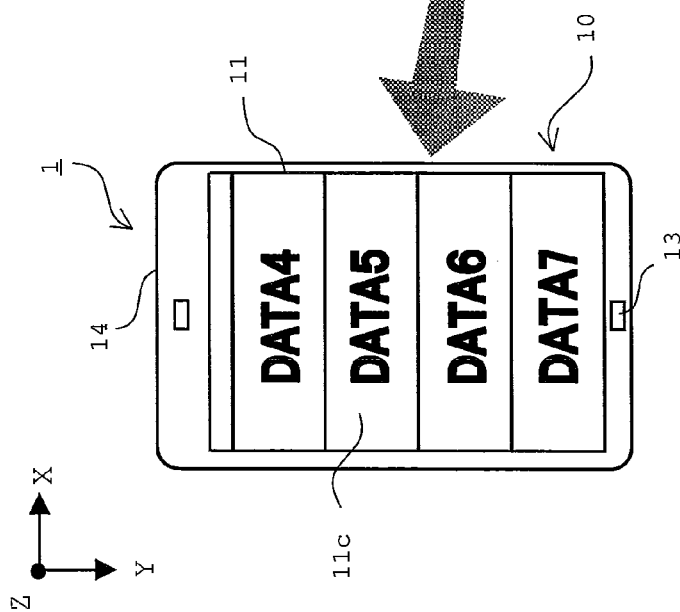

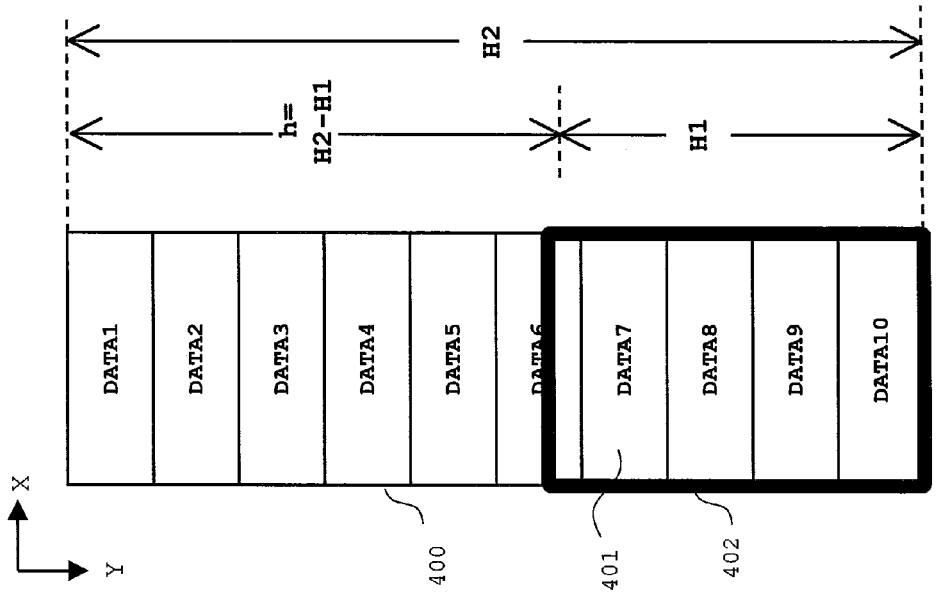
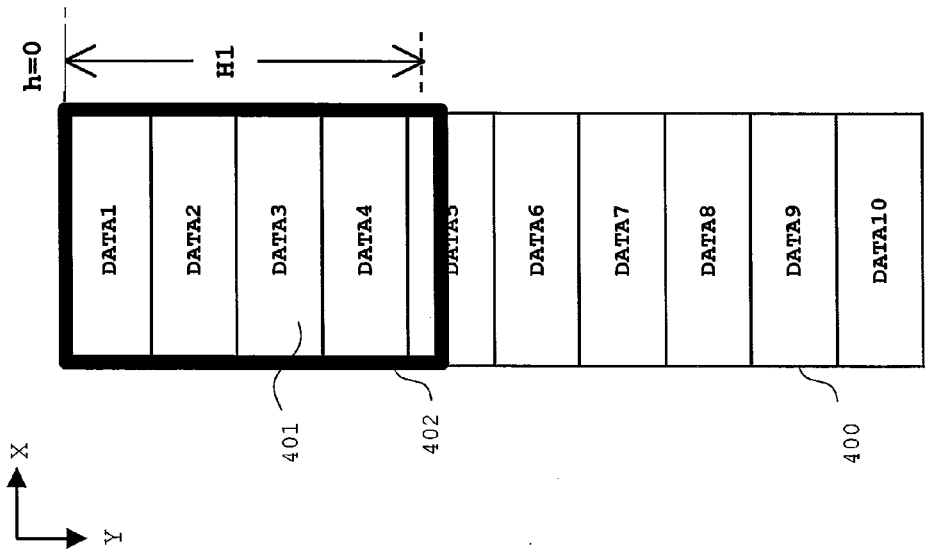

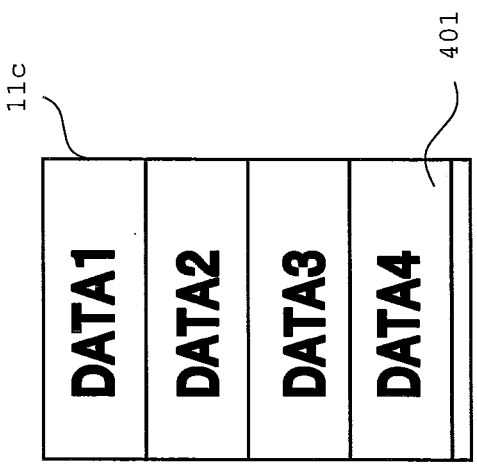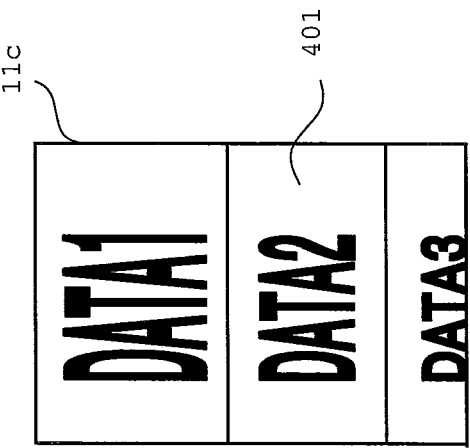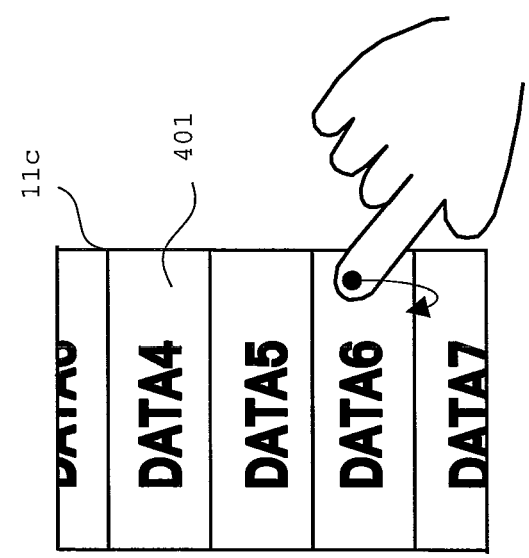

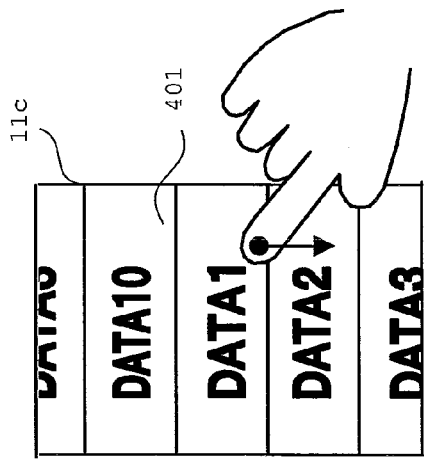
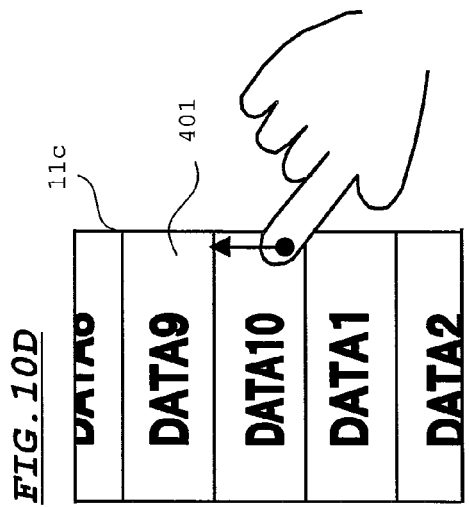
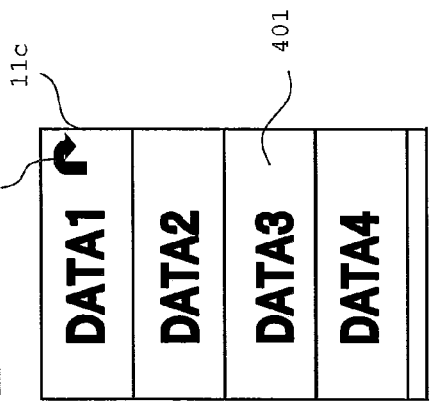
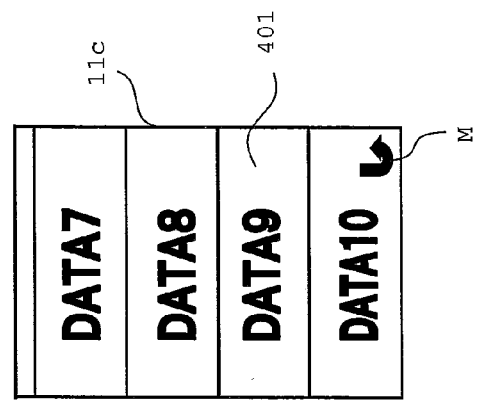

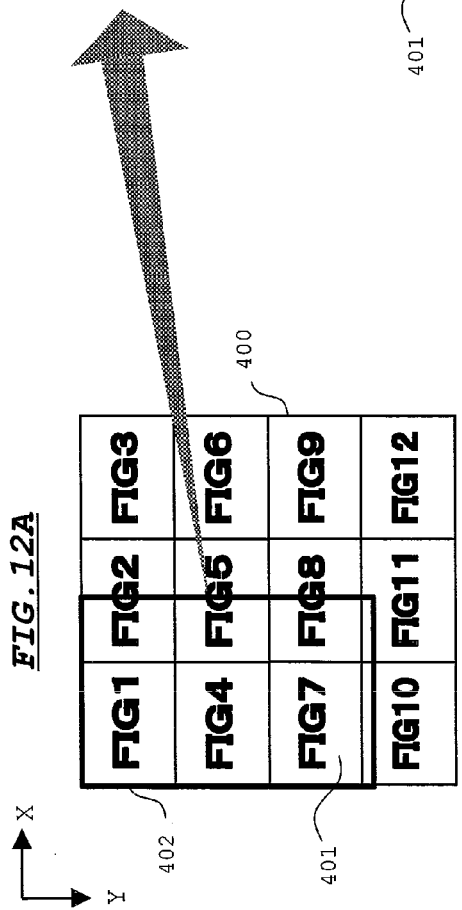
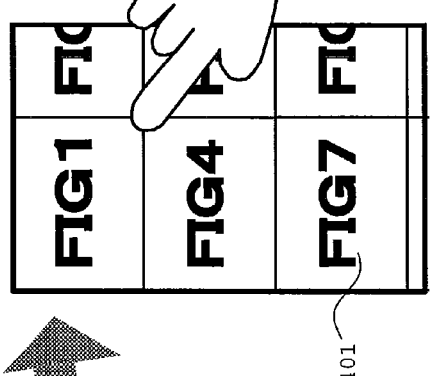
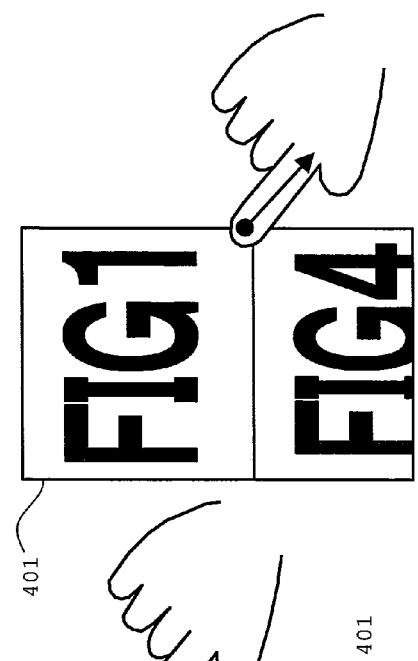
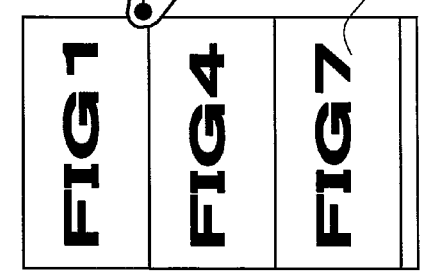
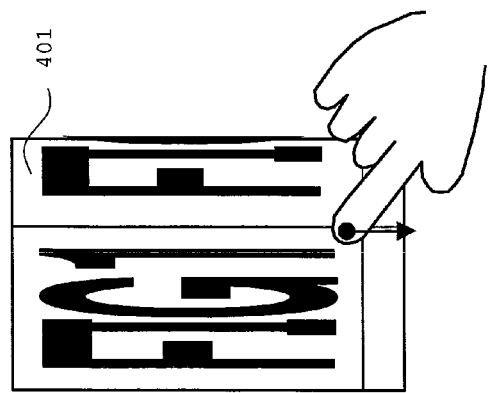

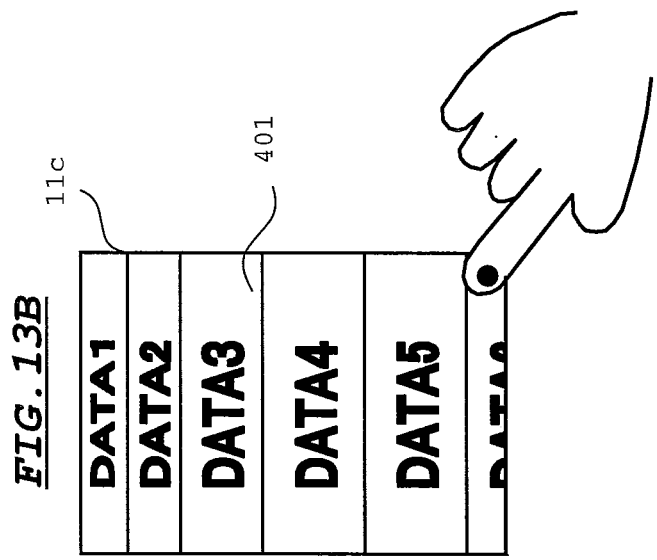
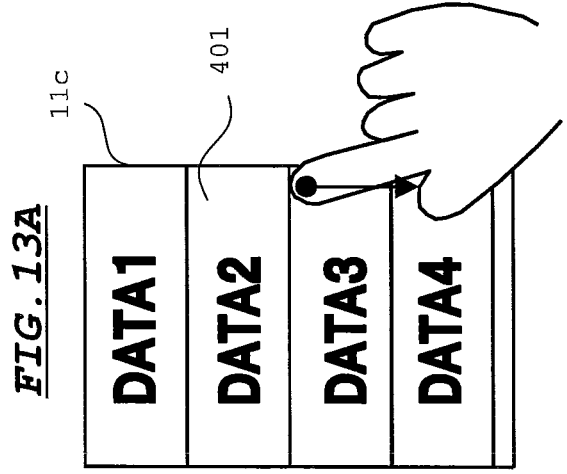

MOBILE TERMINAL DEVICE AND DISPLAY METHOD OF MOBILE TERMINAL DEVICE

This application claims priority under 35 U.S.C. Section 119 of Japanese Patent Application No. 2010-287959 filed Dec. 24, 2010, entitled "MOBILE TERMINAL DEVICE". The disclosure of the above application is incorporated herein by reference.

BACKGROUND OF THE INVENTION

1. Field of the Invention

The present invention relates to a mobile terminal device such as a mobile phone or a PDA (Personal Digital Assistant), and a display method of the mobile terminal device.

2. Disclosure of Related Art

Conventionally, in a mobile terminal device, when a user performs a predetermined input operation using a touch panel, for example, a data file corresponding to the input operation is read from a memory, and an image representing contents of the data file (hereinafter, referred to as a "contents image") is displayed on a display surface. At this time, when a data amount of the data file is large and a range of the contents image is larger than a range of the display surface, images displayable within the range of the display surface are extracted from the contents image, and the extracted partial images are displayed on the display surface. When the user performs a predetermined moving operation on the touch panel, a position of the contents image moves with respect to the display surface according to the moving operation. For example, when the operation is performed so that the contents image moves to a left side, a portion on a right side with respect to the portion of the contents image displayed on the display surface is displayed on the display surface. When a right end of the contents image arrives at a right end of the display surface, even if the user tries to further move the contents image left, the contents image does not move left because no image is present on the right side of the right end of the contents image.

Thus, when the end of the contents image arrives at the end of the display surface, the contents image does not move according to the user's moving operation. However, also when the user's moving operation is not accepted by the touch panel, the contents image does not move and is paused. Therefore, when the contents image does not move, the user does not clearly understand whether the end of the contents image arrives at the end of the display surface or the moving operation is not accepted.

In the mobile terminal device where the contents image moves (scroll) on the display surface, when an image that should be displayed on the display surface is present on an upper side or a lower side of the image displayed on the display surface, for example, a constitution such that a mark is displayed on an upper part or a lower part of the display surface may be employed. In such a mobile terminal device, when a mark is displayed on the display surface, the user understands that an image to be displayed on the display surface is present outside the display surface, and thus the end of the contents image does not arrive at the end of the display surface.

In the above constitution, however, when the mark is displayed within the display surface, an area where the contents image is displayed is narrowed by a display area of the mark. Since the display surface is small particularly in mobile terminal devices, the narrowing of the display area for a contents image is desired to be avoided as much as possible.

SUMMARY OF THE INVENTION

A first aspect of the present invention relates to a mobile terminal device. The mobile terminal device according to this aspect includes a display section having a display surface where a screen including information is displayed, an accepting section which accepts a moving operation for moving the screen, and a display control section which controls the display section based on the moving operation. When the moving operation for moving an end of the screen inside an end of the display surface is performed, the display control section controls the display section so that the screen is deformed on the display surface in a direction of movement of the screen by the moving operation.

A second aspect of the present invention relates to a display method of a mobile terminal device including a display section having a display surface for displaying a screen including information. The display method according to this aspect includes the steps of accepting a moving operation for moving the screen, and when the moving operation for moving an end of the screen inside an end of the display surface is performed, deforming the screen in a direction of movement of the screen by the moving operation.

BRIEF DESCRIPTION OF THE DRAWINGS

The above and other objects and new features of the present invention will be clear more completely by reading the following description of preferred embodiments with reference to the following accompanying drawings.

FIGS. 3A and 3B are diagrams illustrating that partial images within a display region are extracted from a contents image and the partial images are displayed on a display surface according to the embodiment;

FIGS. 5A and 5B are diagrams illustrating a relationship between the contents image and the display region according to the embodiment;

FIGS. 9A to 9C are diagrams for describing a method for informing of the arrival of the end according to the embodiment;

FIGS. 10A to 10D are diagrams for describing a loop function for connecting an upper end and a lower end of the contents image by means of an operation of a loop mark according to the embodiment;

FIGS. 12A to 12E are diagrams for describing a method for informing the arrival of the end according to the embodiment; and FIGS. 13A and 13B are diagrams for describing a method for informing of the arrival of the end according to the embodiment.

The drawings are, however, for the description, and do not limit the scope of the present invention.

DESCRIPTION OF PREFERRED EMBODIMENTS

Figure 1B:
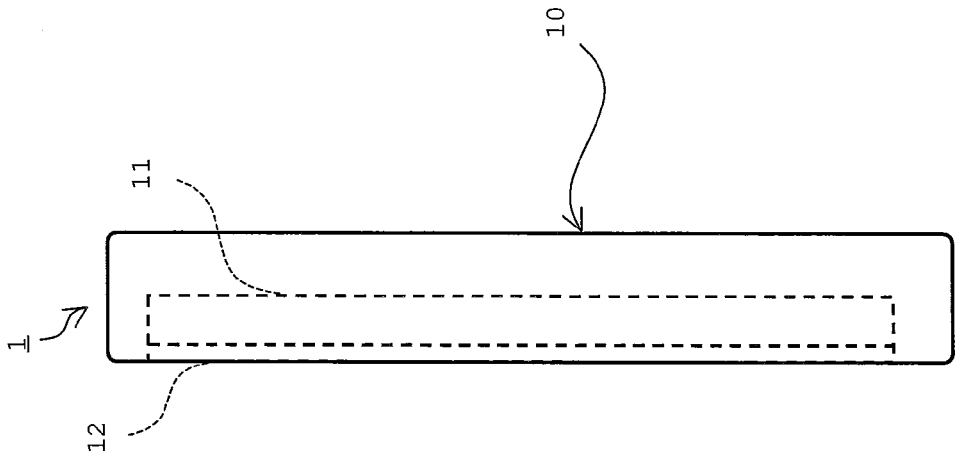
FIGS. 1A and 1B are diagrams illustrating an appearance constitution of a mobile phone according to an embodiment.
Figure 1A:
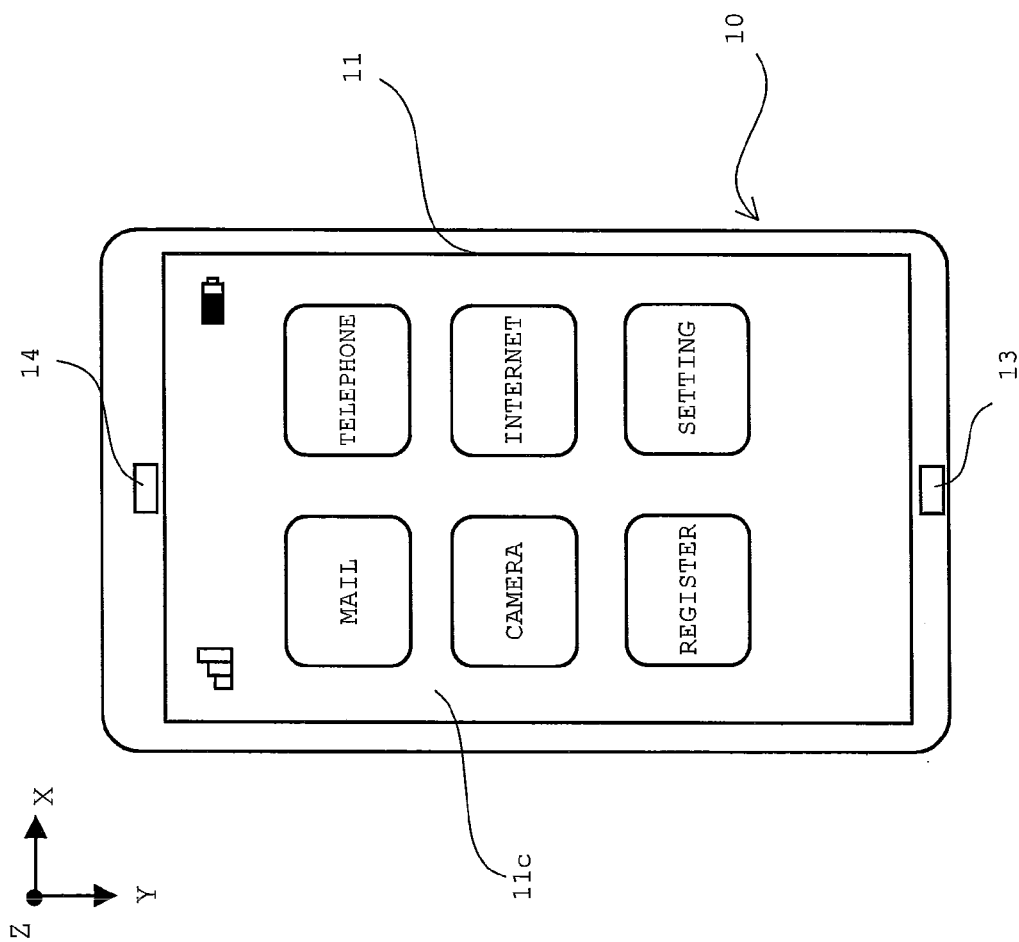

Preferred embodiments of the present invention are described below with reference to the drawings. FIGS. 1A and 1B are diagrams illustrating an appearance constitution of a mobile phone 1. FIGS. 1A and 1B are a front view and a side view.

The mobile phone 1 has a cabinet 10 including a front surface and a rear surface. The front surface of the cabinet 10 is provided with a touch panel. The touch panel has a display 11 for displaying an image, and a touch sensor 12 that is overlapped on the display 11.

The display 11 corresponds to a display section. The display 11 is composed of a liquid crystal panel 11a, and a panel backlight 11b for illuminating the liquid crystal panel 11a. The liquid crystal panel 11a has a display surface 11c for displaying an image, and the display surface 11c appears outside. The touch sensor 12 is arranged on the display surface 11c. Another display element such as an organic EL may be used instead of the liquid crystal panel 11a.

The touch sensor 12 is formed into a transparent sheet shape. The display surface 11c is seen through the touch sensor 12. The touch sensor 12 has first transparent electrodes and second transparent electrodes that are arranged into a matrix pattern, and a cover. The touch sensor 12 detects a change in a capacitance between the first transparent electrodes and the second transparent electrodes so as to detect a position on the display surface 11c touched by a user (hereinafter, referred to as an "input position"), and outputs a position signal according to the input position to a CPU 100, described later. The touch sensor 12 corresponds to an accepting section for accepting a user's input into the first display surface 11c. The touch sensor 12 is not limited to a capacitance touch sensor, and thus may be an ultrasonic touch sensor, a pressure-sensitive touch sensor, a resistive touch sensor, or a photo-detective touch sensor.

That the user touches the display surface 11c means that, for example, the user touches, slides, and flicks the display surface 11c using a contact member such as a pen, or a finger. Further, to touch the display surface 11c actually means to touch a region, where an image on the display surface 11c is displayed, on the surface of the cover over the touch sensor 12. "Slide" means an operation for continuously moving a contact member or a finger on the display surface 11c performed by the user. "Flick" means an operation for releasing the contact member or the finger from the display surface 11c quickly in a flicking manner performed by the user, namely, an operation for moving the contact member or the finger by a short distance for a short time with the contact member or the finger touching the display surface 11c.

A microphone 13 and a speaker 14 are arranged on the front surface of the cabinet 10. The user captures a voice from the speaker 14 via user's ears, and makes a voice to the microphone 13 so as to do voice communication.

A lens window (not shown) of a camera module 15 (see FIG. 2) is arranged on the rear surface of the cabinet 10. An image of a subject is captured through the lens window into the camera module 15.

Figure 2:
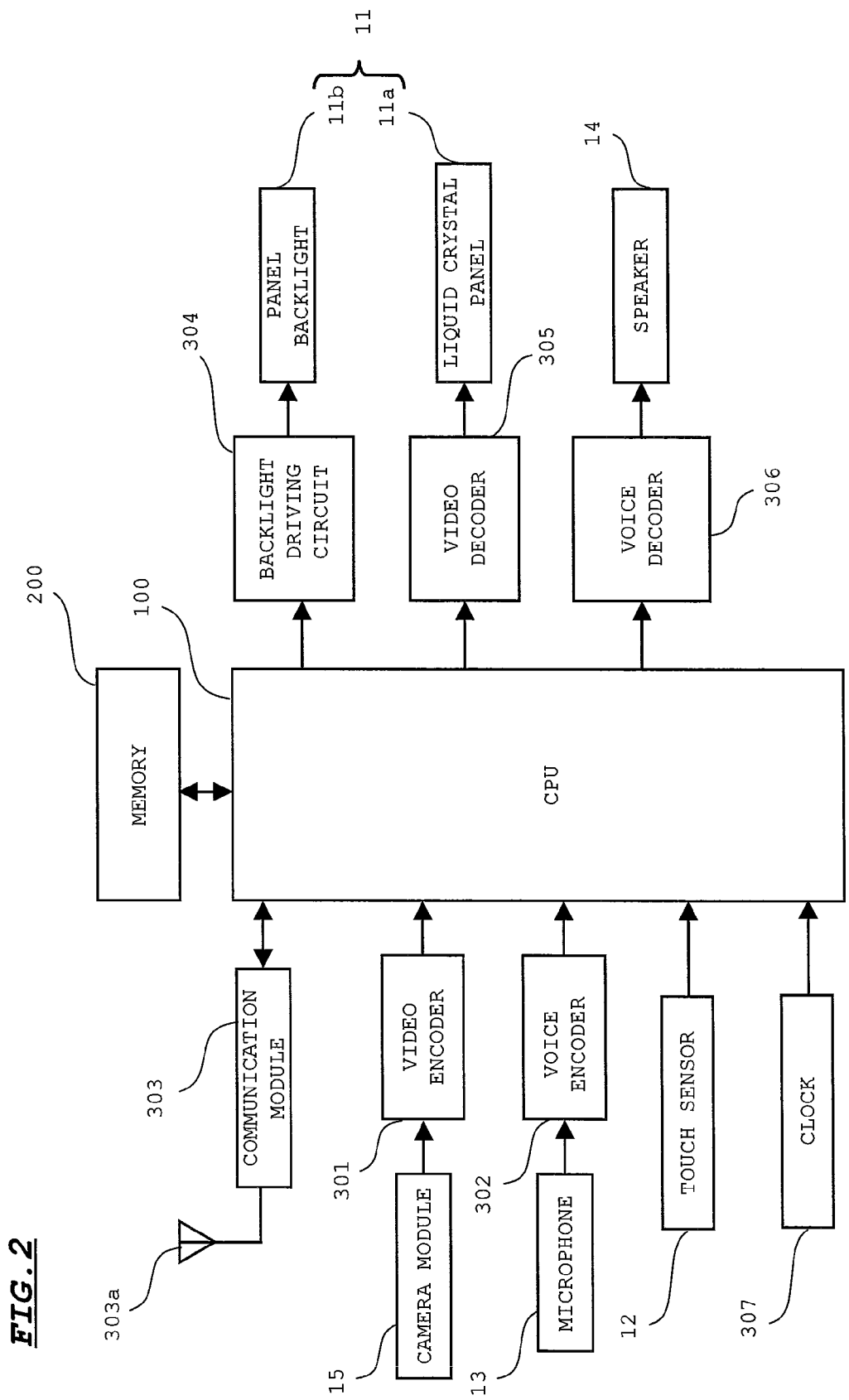
FIG. 2 is a block diagram illustrating an entire constitution of the mobile phone according to the embodiment.

FIG. 2 is a block diagram illustrating an entire constitution of the mobile phone 1.

The mobile phone 1 according to the embodiment includes the above components, the CPU 100, a memory 200, a video encoder 301, a voice encoder 302, a communication module 303, a backlight driving circuit 304, a video decoder 305, a voice decoder 306, and a clock 307.

The camera module 15 includes a photographing section that has an image pickup device such as a CCD, and photographs an image. The camera module 15 digitalizes an imaging signal output from the image pickup device, and makes various corrections such as a gamma correction on the imaging signal so as to output the signal to the video encoder 301. The video encoder 301 executes an encoding process on the imaging signal from the camera module 15 so as to output the signal to the CPU 100.

The microphone 13 converts the collected voices into a voice signal so as to output the signal to the voice encoder 302. The voice encoder 302 converts the analog voice signal from the microphone 13 into a digital voice signal, and executes an encoding process on the digital voice signal so as to output the signal to the CPU 100.

The communication module 303 converts information from the CPU 100 into a radio signal, and transmits the signal to abase station via an antenna 303a. Further, the communication module 303 converts the radio signal received via the antenna 303a into information so as to output it to the CPU 100.

The backlight driving circuit 304 supplies a voltage signal according to a control signal from the CPU 100 to the panel backlight 11b. The panel backlight 11b turns on by means of a voltage signal from the backlight driving circuit 304, and illuminates the liquid crystal panel 11a.

The video decoder 305 converts the video signal form the CPU 100 into an analog or digital video signal that may be displayed on the liquid crystal panel 11a, and outputs the signal to the liquid crystal panel 11a. The liquid crystal panel 11a displays an image according to the video signal on the display surface 11c.

The voice decoder 306 executes a decoding process on the voice signal from the CPU 100 and sound signals of various alarm sounds such as a ringtone or an alarm sound, and converts the signals into analog voice signals so as to output them to the speaker 14. The speaker 14 reproduces a voice and an alarm sound based on a voice signal and a sound signal from the voice decoder 306.

The clock 307 counts time, and outputs a signal according to the counted time to the CPU 100.

The memory 200 is a storage section including a ROM and a RAM. The memory 200 stores control programs for giving control functions to the CPU 100. The control programs include a control program for informing that an end of a contents image 400 displayed on the display 11 arrives at the end of the display surface 11c of the display 11.

The memory 200 stores data files therein. For example, the memory 200 stores data files including information photographed by the camera module 15, data files including information captured from the outside via the communication module 303, and data files including information input via the touch sensor 12 by a user's operation, therein. For example, a data file having contact information includes information such as names, telephone numbers, and e-mail addresses, and these pieces of information are related to each other.

The memory 200 stores a position defining table therein. In the position defining table, positions of images displayed on the display surface 11c are related with contents corresponding to the images. The images include, for example, characters, and pictures such as icons and buttons. The contents corresponding to the images include processes relating to files and programs.

The memory 200 stores operation moving amount specifying information therein. As described later, when the user changes an input position by means of the slide operation or the flick operation, accordingly as shown in FIG. 3B, the contents image 400 moves with respect to a display region 402. A range of the image to be displayed on the display surface 11c is determined as the display region 402 for convenience of the description. The operation moving amount specifying information is information for specifying an operation moving amount W of the contents image 400 after a finger or the like is released from the display surface 11c based on a distance moved by the input position in the slide operation or the flick operation for predetermined time before the release (hereinafter, referred to as a "displacement distance IL of the input position").

For example, the operation moving amount specifying information is a table where the displacement distance IL of the input position is related with the operation moving amount W of the contents image 400. The operation moving amount specifying information may be an arithmetic expression for calculating the operation moving amount W of the contents image 400 based on the displacement distance IL of the input position.

The predetermined time is suitably set. For example, time from previous control timing to current control timing (hereinafter, simply referred to as "control timing interval") is set as the predetermined time. For example, the operation moving amount W represents a distance by which the contents image 400 is moved with respect to the display region 402 (hereinafter, referred to as "an operation moving distance WL"), based on the user's slide operation or flick operation. Alternatively the operation moving amount W represents a speed at which the contents image 400 is moved (hereinafter, referred to as "an operation moving speed WS"), and time in which the contents image 400 is moved.

In the operation moving amount specifying information, as the displacement distance IL of the input position is larger, the operation moving speed WS of the contents image 400 becomes higher, and the operation moving distance WL is set to be longer. As a result, as the user moves the finger touched on the display surface 11c more quickly, the contents image 400 moves longer and more quickly.

The CPU 100 refers to the position defining table stored in the memory 200 so as to specify information input by the user based on a position signal form the touch sensor 12. The CPU 100 operates the camera module 15, the microphone 13, the communication module 303, the panel backlight 11b, the liquid crystal panel 11a, and the speaker 14 based on the input information according to the control program. As a result, various applications such as a telephone call function and a texting function are executed.

The CPU 100 controls the display 11 as the display control section based on the information or the like input by the user via the touch sensor 12. For example, the CPU 100 outputs a control signal for supplying a voltage to the panel backlight 11b to the backlight driving circuit 304 so as to turn on the panel backlight 11b. The CPU 100 outputs a video signal to the video decoder 305, and displays an image on the display surface 11c of the liquid crystal panel 11a. On the other hand, the CPU 100 outputs a control signal for preventing supply of a voltage to the panel backlight 11b to the backlight driving circuit 304 so as to turn off the panel backlight 11b. The CPU 100 further makes a control so as to delete an image from the display surface 11c of the liquid crystal panel 11a.

For example, the CPU 100 reads a data file from the memory 200, and generates the contents image 400 shown in FIG. 3B using information in the data file. When the contents image 400 is larger than the display region 402 having a basic length H1, the CPU 100 extracts image portions within the display region 402 as partial images 401 from the contents image 400. As shown in FIG. 3A, the CPU 100 displays the extracted partial images 401 on the display surface 11c. The contents image 400 and the partial images 401 as parts of the contents image 400 correspond to "an image including information" of the present invention. The information includes pictures or characters. Examples of the pictures are paintings, figures, photographs, and icons. Examples of the characters are symbols, codes, and emblems representing languages and numerics.

Figure 4B:
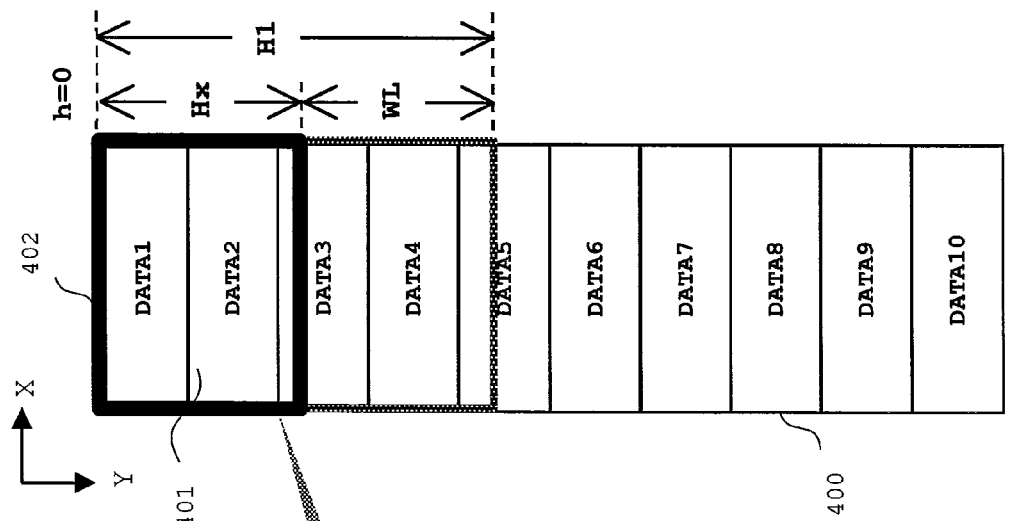
FIGS. 4A and 4B are diagrams illustrating that partial images within the display region are extracted from the contents image and the partial images are displayed on the display surface according to the embodiment.

When the partial images 401 are enlarged to be displayed on the display surface 11c, the CPU 100 sets a length Hx of the display region 402 to a smaller value than the basic length H1 as shown in FIG. 4B, for example. The CPU 100 extracts the partial images 401 in the reduced display region 402, and enlarges the extracted partial images 401 so as to display them on the display surface 11c.

The length Hx and the basic length H1 of the display region 402 are a length between an upper end and a lower end of the display region 402. The length of the display region 402 represents a distance in a vertical direction, and the vertical direction corresponds to the Y-axis direction shown in the drawing.

Figure 4A:
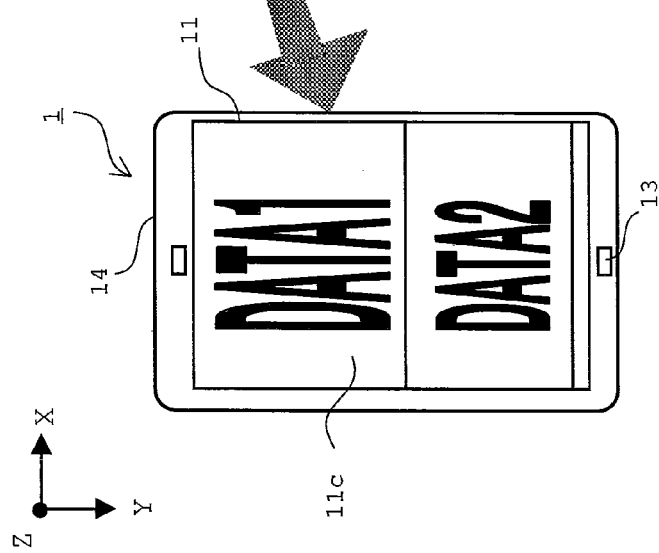

At this time, the CPU 100 may change a magnification percentage of images within the partial images 401 according to positions in the partial images 401. For example, the CPU 100 sets the magnification percentage of an image so that the magnification percentage becomes gradually smaller along a direction indicated by the Y axis (a lower direction in FIG. 4B). As a result, as shown in FIG. 4A, smaller images are displayed towards the lower direction, and thus the partial images 401 are displayed so as to extend down from the upper end as a base point.

The partial images 401 are displayed on the display surface 11c by mapping image data of the partial images 401 in an image memory for image display. A memory region according to the basic length H1 is set in the image memory, and the images mapped in this memory region are displayed on the display surface 11c. The image data of the contents image 400 shown in FIG. 3B are developed in the memory 200 in a state that they are arranged in one direction as shown in FIG. 3B. Predetermined regions are cut from the image data developed in such a manner, and the cut image data are mapped in the memory region of the image memory. The image memory is also set in the memory 200.

In a case of display with a normal magnification, the image data of the partial images 401 with the basic length H1 are cut from the image data of the contents image 400, and the cut image data are mapped in the memory region of the image memory.

In a case of enlarged display, image data of the partial images 401 with a length shorter than the basic length H1, for example, the length Hx are cut from the image data of the contents image 400, and the cut image data are mapped in the memory region of the image memory. In this case, since a size of the cut image data is smaller than a size of the memory region of the image memory, the image data of each line in an X-axis direction in FIG. 4B is mapped repeatedly in the memory region. The number of repeating times at each line is adjusted, so that smaller images are displayed downwards as shown in FIG. 4A, and the partial images 401 are displayed so as to extend down from the upper end as the base point.

As described later, the partial images 401 to be displayed on the display surface 11c change according to the slide operation or the flick operation. This occurs due to a change in the cut regions of the image data of the partial images 401 with respect to the image data of the contents image 400.

The partial images 401 are displayed on the display surface 11c by mapping the image data in the image memory. For convenience of the description, the display control of the partial images 401 with respect to the display surface 11c is described below by using not the image data but the contents image 400, the partial images 401 and the display region 402.

The CPU 100 makes a control so that the partial images 401 displayed on the display surface 11c are moved according to information input by the user via the touch sensor 12.

Concretely, when the slide operation or the flick operation is performed, the CPU 100 receives signals from the clock 307 and the touch sensor 12, and specifies an input position on the touch sensor 12 based on the signals so as to obtain the displacement distance IL of the input position in the Y-axis direction at the control timing interval. The CPU 100 specifies the operation moving distance WL of the contents image 400 at the control timing interval based on the displacement distance IL.

For example, the CPU 100 sets the displacement distance IL of the input position to the operation moving distance WL of the contents image 400 while the user's finger touches the display surface 11c in the slide operation or the flick operation. Further, after the user's finger is released from the display surface 11c after the slide operation or in the flick operation, the CPU 100 specifies the operation moving distance WL according to the displacement distance IL of the input position before the release based on the operation moving amount specifying information in the memory 200.

When the input position displaces to the same direction as the Y-axis direction shown in FIG. 3B, the operation moving direction is set to the same direction as the Y-axis direction. As a result, when the displacement direction of the input position is the Y-axis direction, the partial images 401 move to the Y-axis direction with respect to the display region 402.

The CPU 100 determines a positional relationship between the contents image 400 and the display region 402. When a width of the contents image 400 is equal to a width of the display region 402 as shown in FIG. 3B, the CPU 100 obtains an interval h between the upper end of the contents image 400 and the upper end of the display region 402. The widths indicate distances in a lateral direction, and the lateral direction corresponds to the X-axis direction shown in the drawing.

When the interval h is 0 as shown in FIG. 5A, the CPU 100 determines that the upper end of the contents image 400 matches with the upper end of the display region 402. When the interval h is H2−H1 as shown in FIG. 5B, the CPU 100 determines that the lower end of the contents image 400 matches with the lower end of the display region 402. Note that, H2 indicates a length from the upper end to the lower end of the contents image 400.

Processing Procedure in First Embodiment

Figure 6:
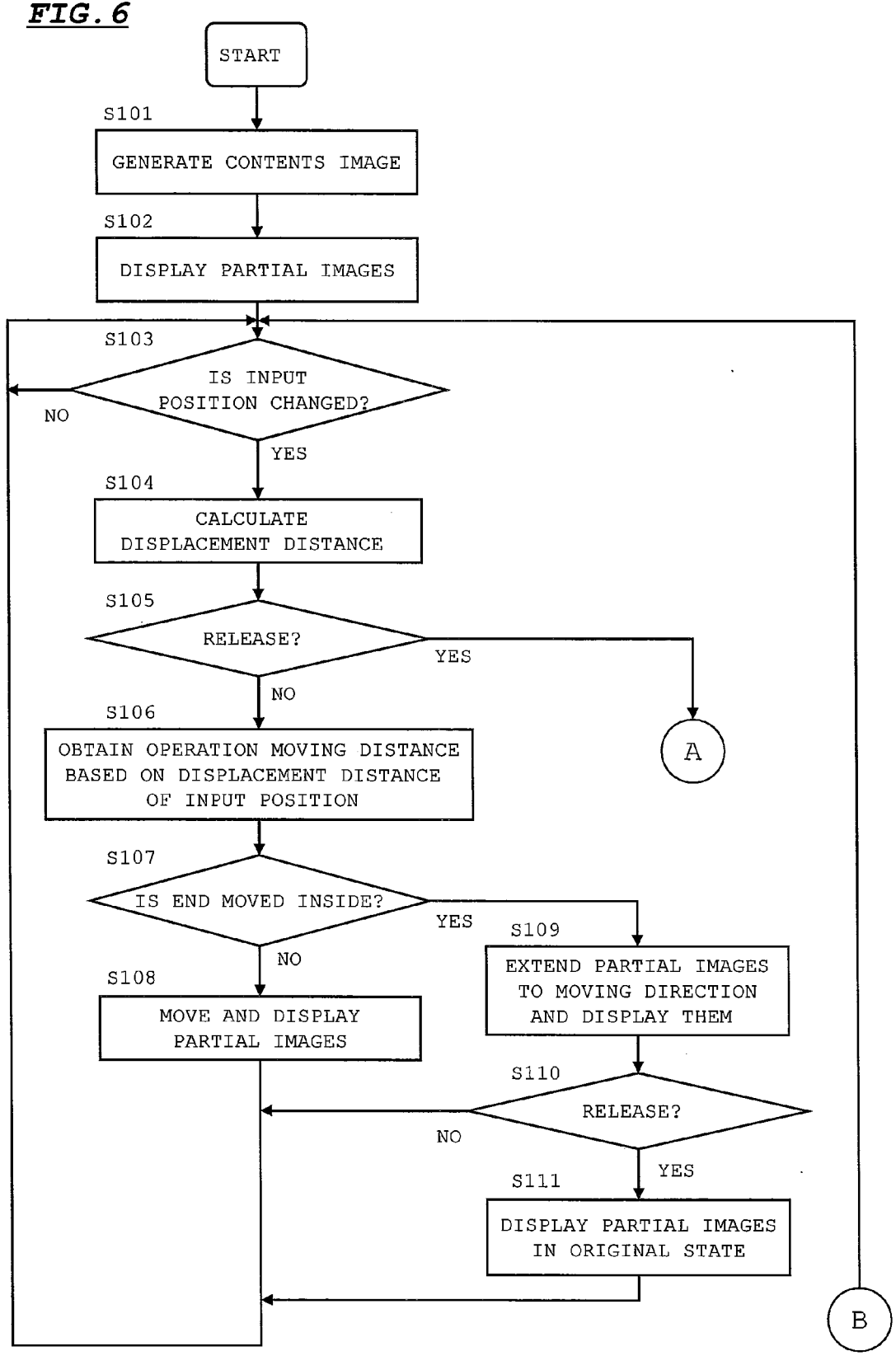
FIG. 6 is a flowchart illustrating a processing procedure for informing of arrival of an end according to the embodiment.
Figure 7:
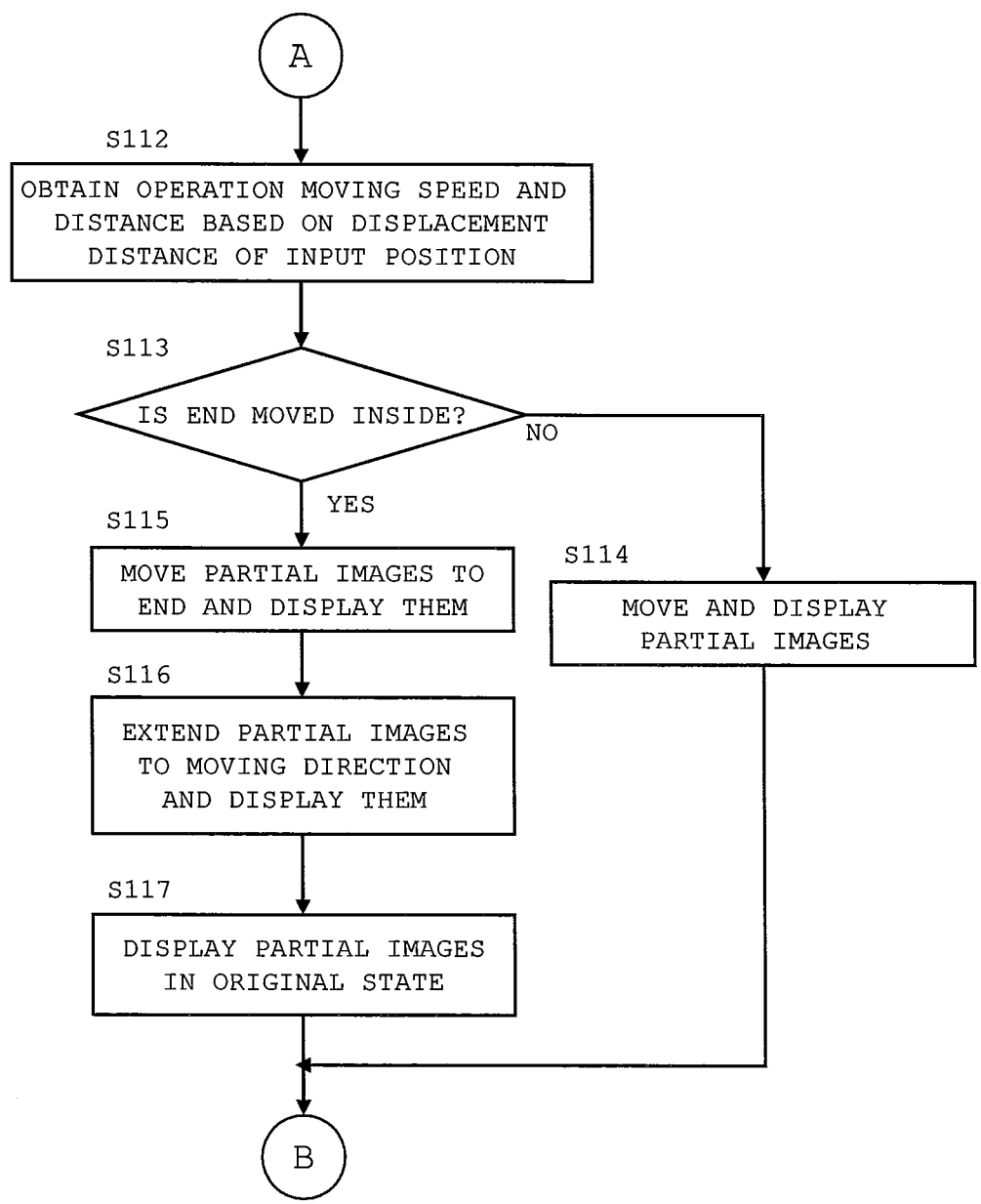
FIG. 7 is a flowchart illustrating a processing procedure for informing of the arrival of the end according to the embodiment.

FIGS. 6 and 7 are flowcharts illustrating a processing procedure for displaying an image generated by using information in the data file. FIGS. 8A to 8D and FIGS. 9A to 9C are diagrams where a contact list is displayed on the display surface 11c.

When the user performs an operation for opening the data file of the contact information, the CPU 100 reads the data file of the contact information from the memory 200. The CPU 100 generates a contents image 400 of a contact list including the contact information using the information in the data file (S101).

Figure 8B:
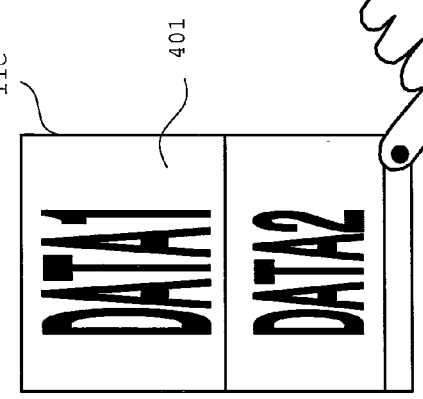
FIGS. 8A to 8D are diagrams for describing a method for informing of the arrival of the end according to the embodiment.
Figure 8D:
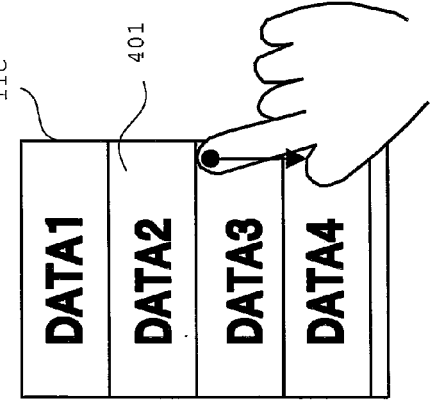
Figure 8A:
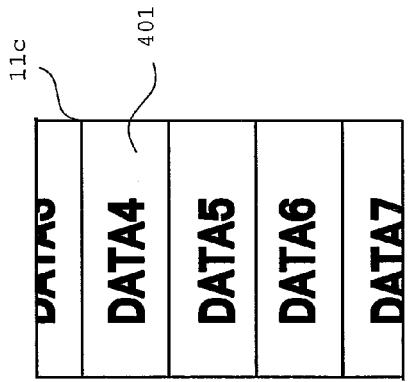

As shown in FIG. 5A, the CPU 100 sets the interval h between the upper end of the contents image 400 and the upper end of the display region 402 to "0" as an initial value. Further, the CPU 100 sets the length of the display region 402 to the basic length H1. The CPU 100 extracts the partial images 401 in the display region 402 from the contents image 400, and displays the partial images 401 on the display surface 11c (S102) as shown in FIG. 8A. As a result, images from DATA1 to DATA4 at the top of the contact list are displayed on the display surface 11c.

When the user touches the display surface 11c with a finger, the CPU 100 specifies an input position based on a position signal from the touch sensor 12. When the user moves the finger, the CPU 100 determines that the input position changes (YES at S103).

When the finger is slid up while touching the display surface 11c as shown in FIG. 8A, the CPU 100 obtains a displacement distance IL:Dy1 in the Y-axis direction of the input position at the control timing interval (S104).

When the position signal is input from the touch sensor 12 here, the CPU 100 determines that the finger is not released from the display surface 11c (NO at S105).

The CPU 100 obtains an operation moving distance WL:Dy1 of the contents image 400 based on the displacement distance IL:Dy1 (S106). The CPU 100 determines a displacement direction of the input position as a moving direction of the contents image 400. At this time, since the displacement direction of the input position is opposite to a direction indicated by the Y axis, the moving direction of the contents image 400 is also opposite to the direction indicated by the Y axis. The user performs an operation so that the contents image 400 moves on the display region 402 to the direction opposite to the direction indicated by the Y axis, namely, to an upper direction by the operation moving distance WL.

The CPU 100 determines whether the end of the contents image 400 is going to be moved inside the end of the display region 402, namely, the end of the display surface 11c by the user's moving operation for moving the part of the contents image 400 displayed on the display surface 11c (S107). For this reason, the CPU 100 adds the operation moving distance WL:Dy1 to a current interval h:0 so as to obtain an interval after moving h:Dy1. The CPU 100 determines whether the interval after moving h:Dy1 is such that "0≤Dy1≤H2−H1". In this case, the interval after moving h:Dy1 is such that "0≤Dy1≤H2−H1". For this reason, even when the contents image 400 is moved with respect to the display region 402 according to the operation moving distance WL:Dy1, the end of the content image 400 does not arrives at the end of the display region 402. Therefore, the CPU 100 determines that the end of the contents image 400 is not going to move inside the end of the display region 402 (NO at S107).

Therefore, the CPU 100 moves the contents image 400 down with respect to the display region 402 by the operation moving distance WL:Dy1, and sets the interval h:Dy1. The CPU 100 extracts the partial images 401 from the contents image 400 in the display region 402 after moving, and displays the partial images 401 on the display surface 11c (S108). As a result, the contents image 400 is moved up and displayed on the display surface 11c according to the moving-up of the finger on the display surface 11c by the user.

When the user performs the slide operation, the CPU 100 repeats the process from step S103 to step S108 at each control timing while the finger touches the touch sensor 12. As a result, as shown in FIG. 8B, the contents image 400 moves up on the display region 402 according to the slide operation for moving the finger up, and images DATA5 to 7 that are hidden under the lower end of the display surface 11c are displayed on the display surface 11c.

Figure 8C:
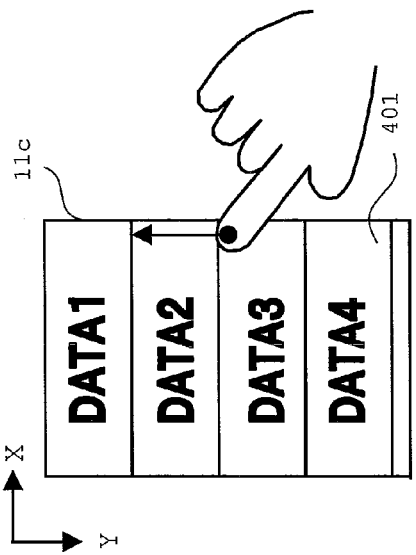

As shown in FIG. 8C, in a state that the interval h is set to "0" and the upper end of the contents image 400 matches with the upper end of the display region 402, when the user slides the finger down along the display surface 11c with the finger touching the display surface 11c, the CPU 100 detects a change in the input position (YES at S103). The CPU 100 obtains a displacement distance IL:Dy2 of the input position at the control timing interval (S104).

Since the finger is not released from the display surface 11c, the CPU 100 determines that the release operation is not performed (S105).

The CPU 100 obtains the operation moving distance WL:Dy2 based on the displacement distance IL:Dy2 (S107). In this case, since the input position displaces to the same direction as the direction indicated by the Y axis, the CPU 100 subtracts the operation moving distance WL:Dy2 from the interval h before moving so as to obtain an interval h:0−Dy2 after moving. Since the interval h after moving is 0 or less, the CPU 100 determines that the end of the contents image 400 is going to move inside the end of the display region 402 (YES at S107).

As shown in FIG. 4B, the CPU 100 reduces the length of the display region 402 from the basic length H1 by the operation moving distance WL:Dy2, and sets the length of the display region 402 to Hx:H1−WL. The CPU 100 extracts the partial images 401 in the reduced display region 402 from the contents image 400, and displays the extracted partial images 401 on the display surface 11c. As a result, the partial images 401 are enlarged by the operation moving distance WL and are displayed.

At this time, the CPU 100 sets an enlargement percentage of the partial images 401 so that the partial images 401 closer to the upper end have larger values. As a result, the partial images 401 are displayed so as to be extended from the upper end of the display surface 11c (S109).

The CPU 100 determines whether the finger is released from the display surface 11c (S110). When the finger is not released, the CPU 100 determines that the release operation is not performed (NO at S110). As a result, the process at step S103 is again executed. When the user continues to slide the finger down on the display surface 11c, the input position displaces (YES at S103). The CPU 100 obtains a displacement distance IL:Dy3 of the input position (S104), and determines that the release operation is not performed (NO at S105). The CPU 100 obtains the operation moving distance WL:Dy3 based on the displacement distance IL (S106), and determines that the end of the contents image 400 is going to move inside the end of the display region 402 (NO at S107). The length of the display region 402 Hx:H1−Dy2 is set, and the size of the display region 402 is reduced. For this reason, the CPU 100 reduces the length of the display region 402 from the length Hx:H1−Dy2 of the reduced display region 402 by the operation moving distance WL:Dy3, and sets the length Hx of the display region 402 to H1−Dy2−Dy3. The CPU 100 extracts the partial images 401 in the further reduced display region 402 from the contents image 400 so as to display the partial images 401 on the display surface 11c. As a result, the partial images 401 are further enlarged to be displayed.

After the partial images 401 are enlarged, the CPU 100 repeats the process from S103 to S107 and S109 until the finger is released. As a result, since the display region 402 is gradually reduced as the finger moves on the display surface 11c, the partial images 401 are gradually extended. As a result, as shown in FIG. 8D, the extended partial images 401 are displayed.

On the other hand, when the finger is released from the display surface 11c after the slide operation, while gradually changing the length Hx of the display region 402 to the basic length H1, the CPU 100 displays the partial images 401 on the display surface 11c (S111). As a result, the partial images 401 shrink to be displayed.

As shown in FIG. 9A, when the user slides the finger down with the finger touching the display surface 11c, the CPU 100 detects a change in the input position (YES at S103), and obtains the displacement distance IL:Dyn of the input position (S104). When the user releases the finger from the display surface 11c after the slide operation, a position signal is not input from the touch sensor 12, and the CPU 100 determines that the finger is released from the display surface 11c (YES at S105).

The CPU 100 obtains the operation moving speed WS and the operation moving distance WL:yn according to the displacement distance IL:Dyn of the input position just before the release based on the operation moving amount specifying information (S112). As a result, the contents image 400 moves at the operation moving speed WS while the contents image 400 moved by the operation moving distance WL:yn after the finger is released.

The CPU 100 subtracts the operation moving distance WL:yn from the interval h:hn before moving so as to obtain the interval after moving h:hn−yn. The CPU 100 determines whether the interval after moving h is between "0" and "H1−H2" (S113). When the interval after moving h is between "0" and "H1−H2", similarly to the above, the CPU 100 determines that the end of the contents image 400 is not going to move inside the end of the display region 402 (NO at S113). The CPU 100 moves the contents image 400 by the operation moving distance WL, and extracts the partial images 401 in the display region 402 after moving so as to display the partial images 401 on the display surface 11c (S114). The CPU 100 returns to the process at step S103.

On the other hand, when the interval after moving h is not between "0" and "H1−H2", the CPU 100 determines that the end of the contents image 400 is going to move inside the end of the display region 402 (YES at S113).

While moving the contents image 400 to the end of the display region 402 at the operation moving speed WS, the CPU 100 displays the partial images 401 on the display surface 11c (S115). As a result, the partial images 401 move by the interval h:hn, and the upper end of the display region 402 arrives at the upper end of the contents image 400.

Even when the upper end of the display region 402 arrives at the upper end of the contents image 400, the operation moving distance WL of "yn−hn" remains. For this reason, as shown in FIG. 9B, since the CPU 100 informs that the end of the contents image 400 arrives at the end of the display region 402, the CPU 100 processes the images.

As shown in FIG. 4B, the CPU 100 gradually reduces the length Hx of the display region 402 from the basic length H1 by the operation moving distance WL:yn−hn. The CPU 100 extracts the partial images 401 in the reduced display region 402 from the contents image 400, and displays the partial images 401 on the display surface 11c (S116). As a result, the partial images 401 are gradually enlarged according to the operation moving distance WL so as to be displayed. For this reason, the partial images 401 are gradually extended so as to be displayed on the display surface 11c. The enlargement percentages of the partial images 401 is set so as to be larger on regions closer to the upper end of the partial images 401. As a result, as shown in FIG. 9B, the partial images 401 are extended down from the upper end as the basic point so as to be displayed.

After the length Hx of the display region 402 arrives at "H1−(yn−hn)" and the partial images 401 are enlarged, the CPU 100 gradually changes the length Hx of the display region 402 from "H1−(yn−hn)" to 0. The CPU 100 restores the size of the display region 402 and simultaneously displays the partial images 401 on the display surface 11c (S111). As a result, the partial images 401 are displayed so as to be reduced towards the upper end of the display surface 11c. As shown in FIG. 9C, the partial images 401 are restored to their original sizes.

The user may flick the display surface 11c down so as to move the partial images 401. In the flick operation, the time from the finger's touch on the display surface 11c to the release, and the displacement distance IL of the input position are very shorter than the time and the displacement distance IL of the input position in the slide operation. However, similarly to the process in the slide operation, the operation moving distance WL is obtained based on the displacement distance IL of the input position between the finger's touch to the release on/from the display surface 11c, and the contents image 400 are moved according to the operation moving distance WL. After the finger is released from the display surface 11c, the operation moving distance WL is obtained based on the displacement distance IL of the input position just before release, and the contents image 400 is moved according to the operation moving distance WL.

According to this embodiment, when the user performs the moving operation for moving the end of the contents image 400 inside the end of the display surface 11c, the partial images 401 are displayed in a extendable manner. For this reason, the user understands that the end of the contents image 400 arrives at the end of the display surface 11c, and a user's input is accepted.

According to this embodiment, the partial images 401 are extended larger towards the end, so that the user easily understands a position of the end of the partial images 401.

According to this embodiment, the partial images 401 are extended larger as a manipulated variable of the moving operation (the displacement distance IL, the operation moving distance WL) is larger. An extension amount of the images to be displayed on the display surface 11c changes according to the user's manipulated variable, so that the user understands more easily that the input is accepted.

According to this embodiment, since the sizes of the enlarged partial images 401 are restored to their original sizes, the user easily understands that the informing that the end of the contents image 400 arrives at the end of the display surface 11c is completed.

Further, according to this embodiment, a mark or the like for informing that the end of the contents image 400 arrives at the end of the display surface 11c is not displayed on the display surface 11c. For this reason, an area on the display surface 11c where the contents image 400 is displayed is prevented from becoming narrow due to the mark for informing about the arrival.

Other Embodiments

The embodiment of the present invention has been described above, but the present invention is not limited to the above embodiment, and the embodiment of the present invention may be variously modified.

For example, after the CPU 100 informs that the end of the contents image 400 arrives at the end of the display surface 11c, as shown in FIG. 10A, an image of a loop mark M for making the contents image 400 into a loop shape may be displayed. When the loop mark M is touched by the user's finger, the upper end and the lower end of the contents image 400 are connected. As a result, when the upper end of the contents image 400 is moved inside the upper end of the display surface 11c, as shown in FIG. 10B, the CPU 100 makes a control so that the partial images 401 such that the lower end of the contents image 400 continues to the upper end of the content image 400 are displayed on the display surface 11c. As a result, after arriving at the upper end of the contents image 400, the lower end of the contents image 400 may be displayed easily. As shown in FIG. 10C, when the lower end of the contents image 400 arrives at the lower end of the display surface 11c, similarly the loop mark M is displayed on the display surface 11c. When after the loop mark M is touched, the lower end of the contents image 400 is moved inside the lower end of the display surface 11c, as shown in FIG. 10D, the CPU 100 makes a control so that the partial images 401 such that the upper end of the contents image 400 continues to the lower end of the contents image 400 are displayed on the display surface 11c.

Figure 11A:
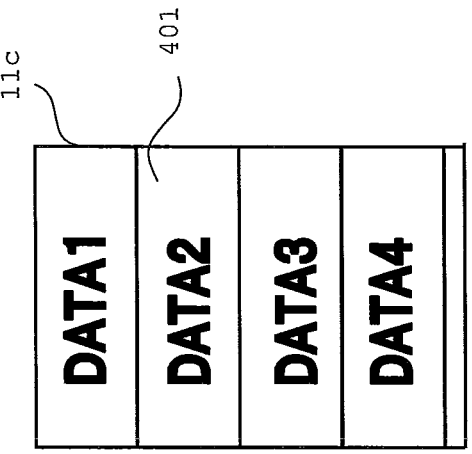
FIGS. 11A and 11B are diagrams for describing a function for displaying a preset portion of the contents image on the display surface after the arrival of the end of the contents image at the end of the display surface is informed according to the embodiment.
Figure 11B:
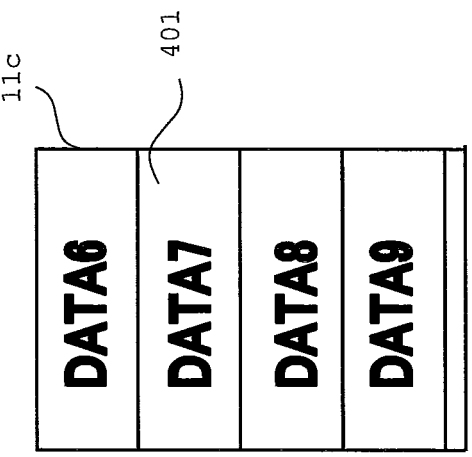

A part of the contents image 400 to be displayed on the display surface 11c after the arrival of the end of the contents image 400 at the end of the display surface 11c is informed may be preset. For example, when the CPU 100 sequentially repeats the operation for extending and contracting the partial images 401, if the number of repetition times is counted and the number of repetition times exceeds a predetermined number of times, the partial images 401 as set portions of the contents image 400 are displayed on the display surface 11c. For example, after the partial images 401 are extended and contracted in a state that the partial images 401 denoted by DATA1 to 4 shown in FIG. 11A are displayed on the display surface 11c, the partial images 401 denoted by DATA6 to 9 shown in FIG. 11B are displayed on the display surface 11c. The portions to be moved may be preset by the user. Portions that are displayed for predetermined time or more as the partial images 401 before the end of the contents image 400 arrives at the end of the display surface 11c may be set as portions to be displayed.

In this embodiment, when the end of the contents image 400 arrives at the end of the display surface 11c, namely, the end of the display region 402 and the operation moving distance WL remains, the end of the contents image 400 moves to the end of the display region 402, and then the partial images 401 are enlarged according to the residual operation moving distance WL. On the contrary, even when the operation moving distance WL remains at the time when the end of the contents image 400 arrives at the end of the display region 402, in the operation at that time, the partial images 401 may be set not to be enlarged based on the residual operation moving distance WL. As a result, when the end of the contents image 400 arrives at the end of the display region 402, the partial images 401 are once paused to be displayed. When the slide operation or the flick operation is again performed in a state that the end of the contents image 400 matches with the end of the display region 402, and the end of the contents image 400 is moved inside the end of the display region 402, the partial images 401 are enlarged according to the operation moving distance WL.

The above embodiment describes the case where the width of the contents image 400 is equal to the width of the display region 402, and the contents image 400 is moved with respect to the display region 402 only in the Y-axis direction. On the contrary, as shown in FIG. 12A, when the size of the contents image 400 is larger than the size of the display region 402 in both the X-axis and Y-axis directions, the contents image 400 may be moved with respect to the display region 402 in the X-axis and Y-axis directions. As shown in FIG. 12B, the upper end and a left end of the contents image 400 match with the upper end and a left end of the display region 402, respectively. When the user moves the finger down on the display surface 11c in this state, as shown in FIG. 12C, the partial images 401 are enlarged in the Y-axis direction shown in the drawing so as to be displayed. When the finger is slid right on the display surface 11c, as shown in FIG. 12D, the partial images 401 are enlarged in the X-axis direction shown in the drawing so as to be displayed. When the finger is further slid to a right-down direction on the display surface 11c, as shown in FIG. 12E, the partial images 401 are enlarged to both the X-axis and Y-axis directions shown in the drawing so as to be displayed. When the finger is released from the display surface 11c, the enlarged images are restored to their original sizes as shown in FIG. 12B. As a result, the user is informed that the end of the contents image 400 in the Y-axis and X-axis directions arrives at the end of the display surface 11c.

In the above embodiment, all the partial images 401 are enlarged, but some of the partial images 401 may be enlarged. For example, the partial images 401 may be enlarged from the end to a position on the display surface 11c touched by the user.

In the above embodiment, the partial images 401 are enlarged so that their enlargement percentages are larger on positions closer to the end. On the contrary, the enlargement percentages of the partial images 401 may be uniform.

In the above embodiment, when the end of the contents image 400 is moved inside the end of the display surface 11c, the partial images 401 are deformed to be extended. On the contrary, as shown in FIG. 13A, when the end of the contents image 400 is further moved inside in the state that the end of the contents image 400 arrives at the end of the display surface 11c, the partial images 401 are deformed to contract as shown in FIG. 13B. In this case, the length Hx of the display region 402 shown in FIG. 4B is set to be longer than the basic length H1. For this reason, when the partial images 401 in the lengthened display region 402 are extracted, the partial images 401 are contracted to be displayed on the display surface 11c. When the partial images 401 contract in such a manner, the contents image 400 that is not displayed on the display surface 11c until now is displayed. As a result, the user understands that the end of the contents image 400 arrives at the end of the display surface 11c and the user's input is accepted.

In the above embodiment, the partial images 401 extend and then contract to their original size so as to be displayed. On the contrary, the partial images 401 may extend and then contract to be smaller than the original sizes, and further extend to the original sizes so as to be displayed.

In the above embodiment, the operation moving distance WL along which the contents image 400 moves is obtained based on the displacement distance IL of the input position. On the contrary, the operation moving distance WL may be obtained based on the speed at which the input position displaces.

In the above embodiment, when the end of the contents image 400 is moved inside the end of the display surface 11c, the contents image 400 extends to a moving direction of the content image 400 from the end of the contents image 400 as the basic point according to the moving operation. On the contrary, when such a moving operation is performed, while the end of the contents image 400 is moving to the direction of the moving operation, the contents image 400 may extend to the direction of the moving operation.

Further, in the above embodiment, when the size of the contents image 400 is larger than the size of the display region 402, namely, the size of the display surface 11c, the contents image 400 moves with respect to the display region 402. When the end of the content image 400 arrives at the end of the display region 402, the partial images 401 are enlarged to be displayed. On the contrary, also when the size of the contents image 400 is the same as the size of the display region 402, namely, the size of the display surface 11c, the process similar to the above may be executed. In this case, since the end of the contents image 400 matches with the end of the display region 402, when the user performs the moving operation, the contents image 400 does not move with respect to the display region 402, and the partial images 401 are enlarged to be displayed.

In the above embodiment, the mobile phone 1 is used, but mobile terminal devices such as PDA and PHS may be used.

The embodiment of the present invention may be modified variously and suitably within the scope of the technical idea described in claims. For example, some parts or all parts in the embodiment may be combined.

What is claimed is:

1. A mobile terminal device, comprising:
a display module having a display surface for displaying a screen including information;
an accepting module which accepts a moving operation for moving the screen; and
a display control module which controls the display module based on the moving operation,
wherein when the moving operation is performed so that an end of the screen is moved inside the display surface, the display control module controls the display module so that the screen is deformed on the display surface in a direction of movement of the screen by the moving operation and extends the screen in a direction of movement of the screen by the moving operation.

2. The mobile terminal device according to claim 1, wherein the display control module executes the control process to extend the screen in a direction of movement of the screen by the moving operation with the end of the screen being defined as a basic point.

3. The mobile terminal device according to claim 1, wherein the display control module executes the control process to extend the screen bigger on regions closer to the end.

4. The mobile terminal device according to claim 1, wherein the display control module executes a control process to change an extension amount of the screen based on a manipulated variable of the moving of the screen in the control process to extend the screen.

5. The mobile terminal device according to claim 1, wherein the display control module controls the display module so that the screen, that is extended after the screen is extended in a direction of movement of the screen by the moving operation, is restored to a state before the extension.

6. The mobile terminal device according to claim 1, wherein
the screen has a larger size than that of the display surface, and
when the moving operation for moving the end of the screen inside the display surface is performed in a state that a part of the screen is displayed on the display surface and the end of the screen is displayed, the display control module executes the control process to extend the screen in a direction of movement of the screen by the moving operation.

7. The mobile terminal device according to claim 6, wherein when the moving operation for moving the end of the screen inside the display surface is performed after the extension of the screen, the display control module controls the display module so that a region of an end opposite to the end of the screen is displayed after a region of the currently displayed screen.

8. The mobile terminal device according to claim 6, wherein the display control module controls the display module so that a portion of the screen displayed on the display surface is moved to a predetermined portion after the screen that is extended by the moving operation is restored to a state before the extension.

9. The mobile terminal device according to claim 1, wherein
the screen has the same size as that of the display surface, and
when the moving operation for moving the end of the screen inside the display surface is performed in a state that the entire screen is displayed on the display surface, the display control module executes the control process to extend the screen to the moving direction of the screen in a direction of movement of the screen by the moving operation.

10. The mobile terminal device according to claim 1, wherein the information includes at least one of pictures and characters.

11. A mobile terminal device, comprising:
a display module having a display surface for displaying a screen including information;
an accepting module which accepts a moving operation for moving the screen; and
a display control module which controls the display module based on the moving operation,
wherein when the moving operation is performed so that an end of the screen is moved inside the display surface, the display control module controls the display module so that the screen is reduced to the moving direction of the screen in a direction of movement of the screen by the moving operation.

12. A display method of a mobile terminal device including a display modules having a display surface for displaying a screen including information, the method comprising the steps of:
accepting a moving operation for moving the screen; and
controlling the display module based on the moving operation,
when the moving operation for moving an end of the screen inside the display surface is performed, controlling the display module so that the screen is reduced to the moving direction of the screen in a direction of movement of the screen by the moving operation.

* * * * *